United States Patent
Rabe (10) Patent No.: US 7,356,576 B2
(45) Date of Patent: Apr. 8, 2008

(54) METHOD, APPARATUS, AND COMPUTER READABLE MEDIUM FOR PROVIDING NETWORK STORAGE ASSIGNMENTS

(75) Inventor: Kenneth J Rabe, Goleta, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 810 days.

(21) Appl. No.: 10/260,292

(22) Filed: Oct. 1, 2002

(65) Prior Publication Data

US 2004/0064534 A1   Apr. 1, 2004

(51) Int. Cl.
*G06F 15/177* (2006.01)

(52) U.S. Cl. .................... 709/221; 709/220

(58) Field of Classification Search .......... 717/171
See application file for complete search history.

(56) References Cited

U.S. PATENT DOCUMENTS

| | | | |
|---|---|---|---|
| 5,923,850 A * | 7/1999 | Barroux | 709/224 |
| 6,311,213 B2 * | 10/2001 | Dawson et al. | 709/217 |
| 6,442,696 B1 * | 8/2002 | Wray et al. | 726/5 |
| 6,792,452 B1 * | 9/2004 | Philyaw | 709/217 |
| 6,832,299 B2 * | 12/2004 | Shimada et al. | 711/148 |
| 7,013,462 B2 * | 3/2006 | Zara et al. | 717/177 |
| 2001/0013059 A1 * | 8/2001 | Dawson et al. | 709/217 |
| 2002/0004816 A1 * | 1/2002 | Vange et al. | 709/202 |
| 2002/0007445 A1 * | 1/2002 | Blumenau et al. | 711/153 |
| 2002/0054069 A1 * | 5/2002 | Britt et al. | 345/719 |
| 2002/0078382 A1 * | 6/2002 | Sheikh et al. | 713/201 |
| 2004/0015957 A1 * | 1/2004 | Zara et al. | 717/174 |
| 2004/0059822 A1 * | 3/2004 | Jiang et al. | 709/230 |
| 2005/0257214 A1 * | 11/2005 | Moshir et al. | 717/171 |

* cited by examiner

Primary Examiner—John B. Walsh (57) ABSTRACT

Network storage assignments are provided by comparing identification information received from a networked computer to identification information stored in association with network storage assignments for a plurality of networked computers. Upon received identification information of the networked computer matching the stored identification information, corresponding network storage assignments are provided to the networked computer.

30 Claims, 3 Drawing Sheets

METHOD, APPARATUS, AND COMPUTER READABLE MEDIUM FOR PROVIDING NETWORK STORAGE ASSIGNMENTS

BACKGROUND OF THE INVENTION

Storage networks present a new paradigm to the storage world. The old storage paradigm with which most operating systems are designed to work, allocate a single computer device to a single storage device. In contrast to the old storage paradigm, storage networks allow multiple computers and storage devices to be connected. In other words, with a storage network, any attached or networked computer (connected via any wired or wireless connection to any computer network such as a local area network (LAN), wide area network (WAN) etc.) is connected and can access one or more storage devices (or even one or more storage networks). A storage network may include at least one server and at least one storage device (such as a redundant array of independent disks (RAID) array, or any other type of storage array or storage medium including flash random access memory, tape, etc.).

Figure 1:
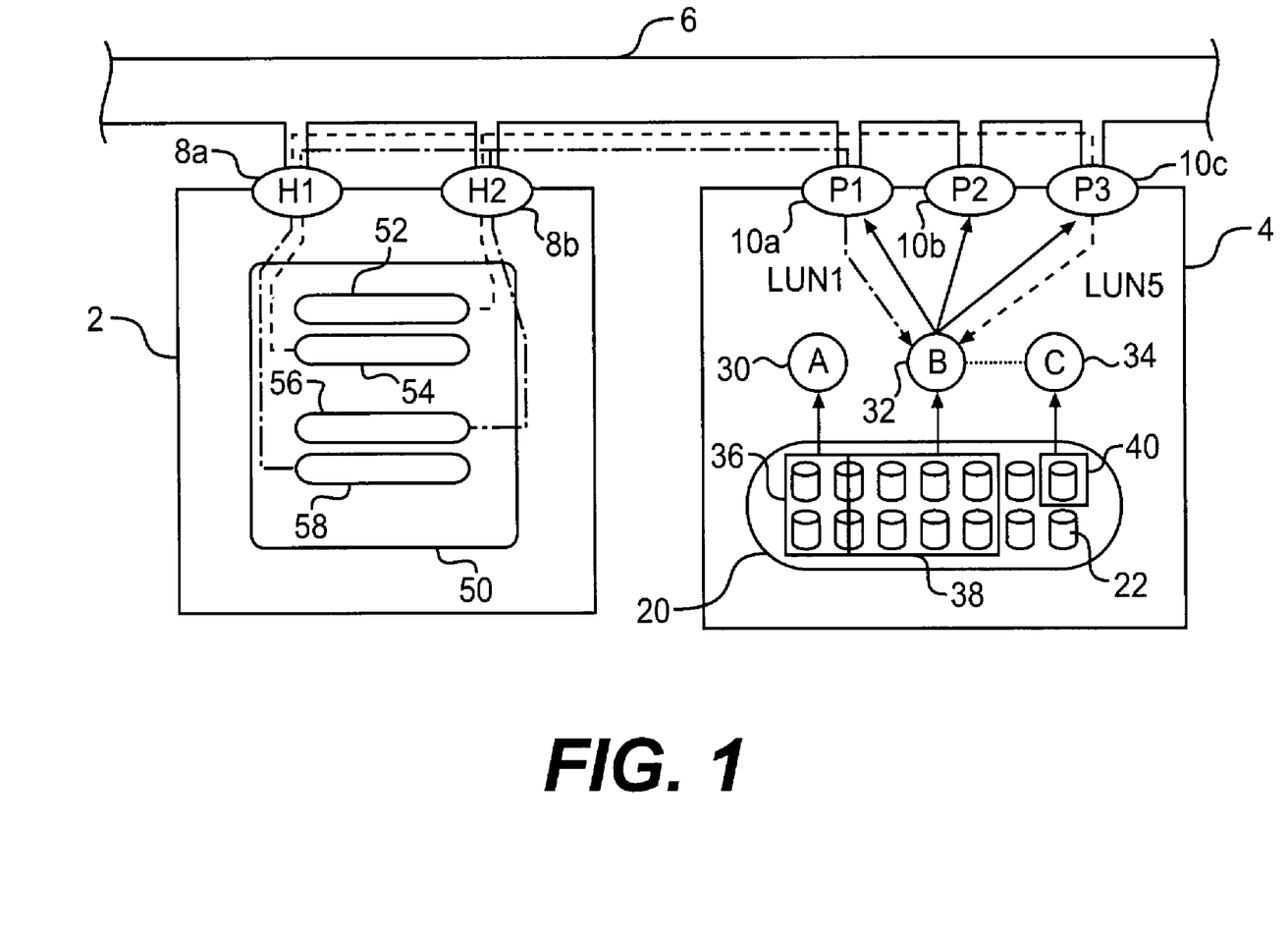
FIG. 1 illustrates networked storage allocation between a networked computer and storage device.

FIG. 1 illustrates a computer 2, connected to a network storage device 4 through some type of network connection such as a wired connection 6, a wireless connection, etc. For the sake of brevity, a network server is not illustrated, additional networked computers 2 are not illustrated, etc.

A storage device 4, such as that of a RAID array for example, typically contains some type of storage medium 20, such as a plurality of disk spindles 22, for example. Alternatively, the storage medium 20 can include RAM, such as a type of flash RAM, tape drive storage, or any other type of storage enabling the storage device to persistently store data for networked computers 2.

A storage device 4 can publish internal storage to its networked computers 2 (it's hosts or "consumers"), by creating logical units of storage (LU's) using various methods that match with the storage consumers needs: for example, logical units stripped across multiple spindles to improve throughput; logical units mirrored across multiple spindles to improve data resiliency; and/or various combinations of these two to provide both improved throughput and resiliency.

FIG. 1 shows three such LU's A, B, C, numbered as 30, 32, and 34, respectively in FIG. 1. These units are constructed by being mapped to one or more disk spindles wherein, for example, A is mapped to the spindles in box 36, B is mapped to the spindles in box 38 (some of which overlap the spindles of box 36 for example) and C corresponds to the single spindle in box 40.

Consumers or networked computers can access and thus be assigned a particular logical unit by communicating requests to a port, such as port P1, P2, or P3 labeled 10A, 10B or 10C respectively in FIG. 1, on a storage device 4 and tagging the request with a port relative address called a logical unit number (LUN). As an example, FIG. 1 shows logical unit B mapped out of two different ports by the storage device 4. A consumer wanting to use logical unit B for storage, accesses it by sending a request to port 1, tagged with LUN 1, or to port 3 tagged with LUN 5. This is an example of a storage device 4 providing multiple paths to the same logical unit, which is commonly done for full tolerance and/or improved bandwidth.

Consumers of networked storage 4 can also have multiple connections into a storage network for the same reasons. FIG. 1 illustrates a single computer 2 that has two connections into the storage network via host bus adaptors H1 and H2, labeled 8a and 8b, respectively.

The dashed lines in FIG. 1 represent various paths from the computer 2, through the storage network, to logical unit B. From the perspective of the computer 2, each path will appear to that computer as an unrelated block of storage. Internally, the computer's operating system physically creates "objects" to represent the blocks of storage that it has been assigned, as shown by elements 52, 54, 56 and 58 of FIG. 1 for example. In this example, the computer 2 has flow paths to logical unit B (although it may have flow paths to one or more LUs) and has created four different operating system objects that ultimately point to the same logical unit of storage, wherein the objects can be stored as follows: 52-disk B:2, t:3, LUN:5; 54-disk B:1, t:3, LUN:5; 56-disk B:2, t:1, LUN:1; and 58-disk B:1, t:1, LUN:1, wherein the first "disk B" entry indicates the host bus adapter connector of the computer 2 to the network 6; the second "t entry" indicates the ports of the storage device; and the "LUN" indicates for the particular port relative address.

Network storage allocation software has been developed to allocate various networked computers to various areas of storage, across one or multiple storage devices for example. Thus, a single computer 2 need not be mapped to various storage areas within the storage device 4, but may be mapped to multiple storage devices. However, for security purposes, it is important that only computers entitled to access of a particular portion of storage be able to access any particular allocated storage location. In addition, since storage allocation can be somewhat complex within a particular network, it is important that such storage allocation be done as efficiently as possible.

SUMMARY OF THE INVENTION

An embodiment of the present invention is directed to a method of providing network storage assignments by comparing identification information received from a network computer to identification information stored in association with network source assignments for a plurality of network computers. Upon received identification information matching the stored identification information, corresponding network storage assignments are provided to the network to computer.

BRIEF DESCRIPTION OF THE DRAWINGS

Exemplary embodiments of the invention are described throughout the specification and are illustrated and explained with reference to the figures below, wherein like reference numerals represent like elements and wherein.

DETAILED DESCRIPTION OF THE PREFERRED EMBODIMENTS

Storage allocation software is used to control and assign access of various ones of a plurality of networked computers to one of more networked storage devices in a simple, safe and dynamic fashion. This software permits easy allocation of storage by an administrator, for example. The administrator may utilize a graphical user interface (GUI), choose from a LUN allocation menu, and select from storage elements that are available to be assigned and unassigned. The administrator can merely apply these selected storage elements to any given computer on the network to provide network storage.

In order to make such a system even more efficient, however, network storage assignments can be provided in an efficient and still secure manner utilizing previously stored information, when for example, such information is no longer present in a network computer. For example, when the storage allocation software is reinstalled on a networked computer, the particular network storage assignment previously assigned to that particular computer are lost. Instead of having a user of a particular computer, or an administrator, manually configure new storage assignments to that particular computer, a method of providing network storage assignments according to the present application may be used.

In particular, identification information received from the networked computer can be used and can be compared to identification information previously stored in the network, in association with network storage assignments for a plurality of network computers. Typically, as storage is allocated to various computers on the network, such network storage assignments are stored in a database for example, along with corresponding identification information of the various networked computers.

When a computer is attached to the network, or during a reinstallation of storage allocation or other software for example, certain information identifying that particular computer is typically sent to and received by a network server. For example, when the networked computer or host-agent service starts or is re-started, it posts an event to the server, such as the management server, for example. The payload of this event typically contains the identification information which can be used to identify which host computer was started.

That information can then be compared to information stored in a database or other type of data repository of the network server, for example, and when a match is detected, the previously stored network assignments can be provided to the networked computer. This therefore enables the computer to have access to and utilize its previous network storage assignments in an efficient and secure manner.

Figure 2:
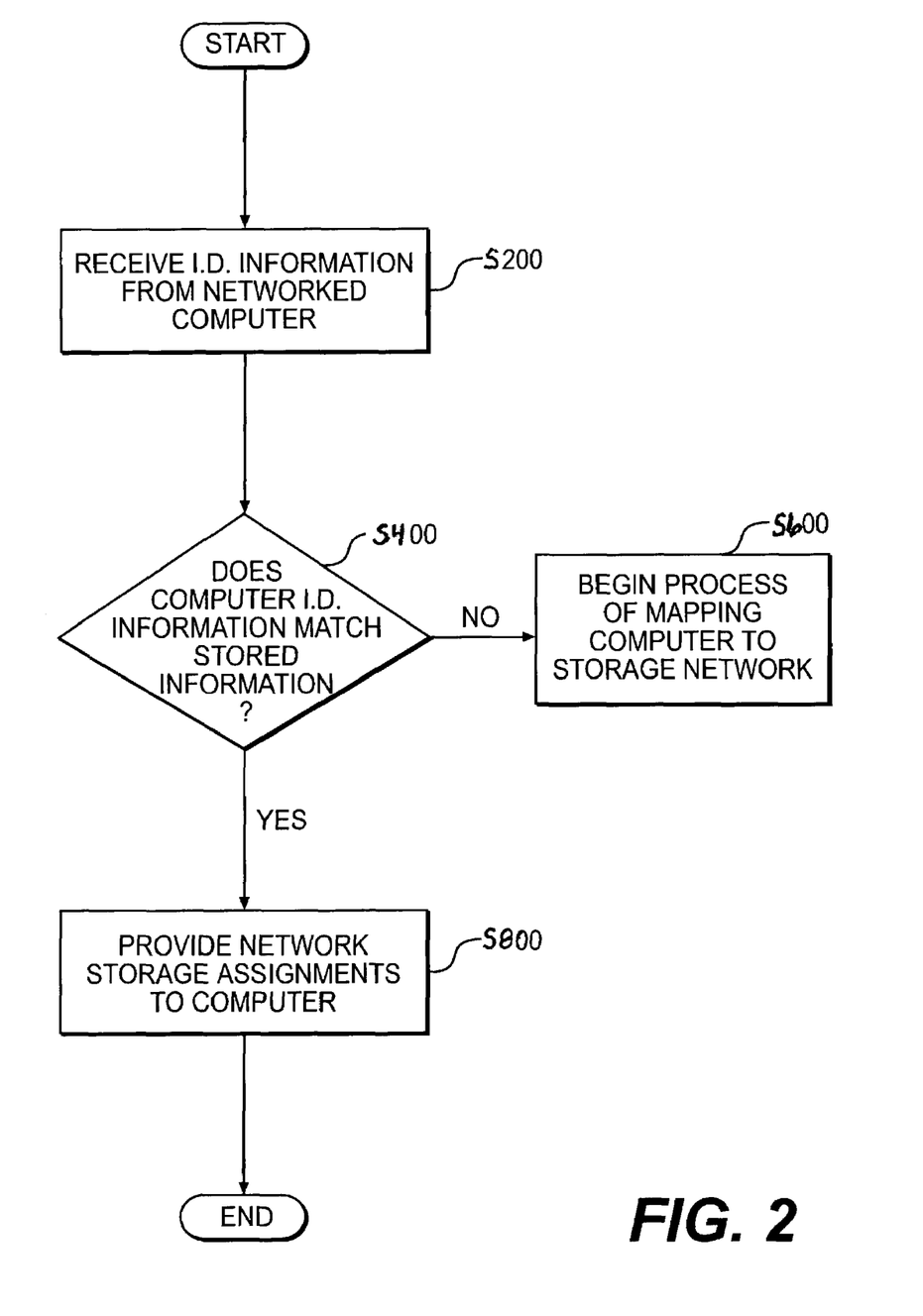
FIG. 2 illustrates a methodology for providing network storage assignments according to an embodiment of the present invention.

FIG. 2 illustrates a flowchart of one embodiment of a method of providing network storage assignments. Initially, in step S200, when software is reinstalled on a networked computer or when a computer is added to the network, identification information is received for the computer. For example, the identification information may be received through an event passing mechanism in use by storage allocation software. The storage allocator component on a server on the network, such as a management server for example, can register for a category of events, in this case a type of host boot event. When one of these events is posted, the allocator component on the server then processes the event and its payload.

The host computer typically posts an event to the server, such as the management server, when the host computer service starts during an initialization of the host computer's storage allocator component. The payload of this event typically contains the IP address, operating system, machine name, a unique ID, and other service related information. The management server typically does not query to receive this information, but may register for notification for host computer boost events. Such an event mechanism is fairly standard in the industry and thus will not be discussed further for the sake of brevity.

This information can thus be received by a server on the network for example, and may include information, for example, including at least one of an internet protocol (IP) address of the computer, a unique machine name associated with the computer, an operating system of the computer, a unique ID assigned to the computer, etc. When a computer installs storage allocation software, a unique identification is generated (based on the JAVA virtual machine unique ID for example), and this unique identification is written to a file on the network and is stored in a database by a network server, for example. This unique ID stays with the computer and is an easy way to identify one particular computer. However, if software such as a new operating system, storage allocation software, etc., is reinstalled on the computer, this unique ID is lost and a new ID will be generated, and will be associated with the computer. Accordingly, although the unique ID information can be used as identification information identifying a particular networked computer, such unique ID information is typically lost when software is reinstalled on a computer and a different unique ID is generated. Thus, although such a unique ID can, in theory, be used to access corresponding storage assignments from the database, this typically cannot occur when reinstallation, for example, of storage allocation software causes a different non-matching unique ID to be generated.

With regard to the machine name, a relatively unique and selectable name is assigned to each computer and is sent to a server on the network when installed. The machine name may be and is typically chosen by an administrator of the computer and is typically unique for given network domain. This process is typically unrelated to storage area management software provided. The machine name is typically chosen during the installation process of the computer and/or during network configuration of the computer, and is normally done before any installation of storage area management software.

Finally, with regard to the IP address and operating system, these are easily accessible in that they are typically provided by a computer when assigned to a network or when new software has been installed on the computer. Each host computer on a network includes a single IP address by which the machine can be reached, which is typically set up by the network administrator.

The IP information received in Step S200 of FIG. 2 by a server from a payload of a computer for example, preferably includes that of an IP address and machine name, and even more preferably, includes an indication of the operating system. After the ID information is received from a networked computer in Step S200, the ID information is compared to stored information to determine if there is a match in Step S400. Preferably, the network server includes a database for example, or any other type of data repository (flat file, memory structure, etc.) that can be used to store the information, adapted to store network storage assignments for at least one networked storage device and corresponding (associated in some way) identification information for each of a plurality of networked computers. Thus, the server, in such a database, includes a type of map of the relationship of the storage assignments on at least one network storage device for each of a plurality of networked computers.

If the received computer ID information is found to match stored ID information in Step S400, then the server recognizes that storage assignments on the at least one network storage device have previously been allocated to that particular computer, even though the computer itself had previously lost that storage allocation information based on reinstallation of software, for example. Thus, if a match is found in Step S400, the corresponding network storage assignments, stored in association with and corresponding to the ID information received from the network computer as indicated in the database, are provided to the network computer in Step S800.

As such, although a network computer may lose complex storage assignments on at least one network storage device based on certain events, such as reinstallation of storage allocation software for example, those assignments can easily be identified and provided back to the computer in an efficient manner which maintains adequate security. As such, a user of the networked computer does not need to go through the complex process of attempting to reconfigure the networked computer with new storage assignments and does not waste the previously stored allocation of software assignments on the at least one network storage device.

The current state of the network, such as a storage area network (SAN) for example, is always typically stored in some manner, such as in a database or other data repository, on the network. Each time a user assigns or unassigns a LUN, the database is typically updated to reflect the new state of assignments. This is typically done as part of the assignment process. The management server service typically has a dependency on the database service. Further, operating systems such as Windows NT for example, enforce this dependency and will typically shutdown the management server service if the database service is shutdown. Likewise, if the database is not running when the management server service is started, the database will typically be started.

Thereafter, the procedure may end as stated in FIG. 2. Optionally, the provided network storage assignment may be rejected by the networked computer and thereafter new storage assignments could be allocated to the computer in a different manner.

In Step S400, if the computer ID information received does not match any stored ID information, the process proceeds to Step S600 where a new process of mapping the computer to the at least one network storage device may begin. In such a step, network storage assignments may be allocated to the networked computer.

Further, it should be noted that the methodology of FIG. 2 can include as few as two steps to provide network storage assignments. First, identification information received from a networked computer is compared to identification information stored in association with network storage assignments for a plurality of networked computers. Next, corresponding stored network storage assignments are provided to the networked computer upon the received identification information matching the stored identification information.

Preferably, the IP address and machine name are used as ID information to identify a particular computer on a network, and such identification information is used to access network storage assignments. By using these types of identification information, the allocated network storage assignments can easily be identified and provided to the networked computer. Further, as such types of information rarely, if ever, change, they are excellent indicators of the fact that the same computer is still connected to the network. Thus, the security of permitting that same computer to have access to the same network storage assignments is maintained.

Even more preferably, the IP address, machine name, and operating system of the networked computer are each checked before the network storage assignments are provided. The operating system is preferably checked to make sure the operating system has not changed. If the operating system has changed, the previously generated network storage assignment may not work with the new operating system and thus, new network storage assignments should probably be generated. Thus, the operating system is preferably part of the identification information provided by the network computer and received by the server, wherein corresponding stored network storage assignments are not provided to the computer upon the operating system not matching the stored operating system indication. In fact, it is preferred that if any of the IP address, machine name, and operating system do not match the stored ID information, corresponding network storage assignments are not provided to the networked computer.

It should be noted that although the use of the aforementioned pieces of ID information are preferably received and stored as identification information identifying a networked computer, other types of information may be stored in association with network storage assignments and may be received and used to identify the networked computer. It is preferred, however, that at least two of the aforementioned pieces of ID information are used to identify the networked computer before providing stored network storage assignments because it is incredibly unlikely for the aforementioned pieces of ID information to all change at the same time, without a network administrator being made aware of such a change. Thus, such pieces of information are a good indication that previous allocated network storage assignments are being provided to the same computer to which they were originally allocated. This enhances security of the system by not allowing access to information previously stored on the network to a computer which should not be provided with access to such storage allocations.

Additionally, it should also be noted that when a computer is first installed on the network, it should be noted that information indicating the network storage assignments of that computer are sent and received by the server, along with information identifying the computer. During the processing of the computer host boot event, the server typically requests that the host computer send the host assignments back to the server. The server then can compare the list of assignments that were provided by the host computer, with a master list stored, in a database or other data repository for example, on the server.

Of course, when the computer is first installed on the network, these assignments are typically not correct and not related to any stored identification information previously stored in a database of the server for example. If the received information indicating that network storage assignments is compared to stored information and found to be correct, the received network storage assignments may be acknowledged by the server and the procedure of assigning network storage assignments to a networked computer is complete.

Figure 3:
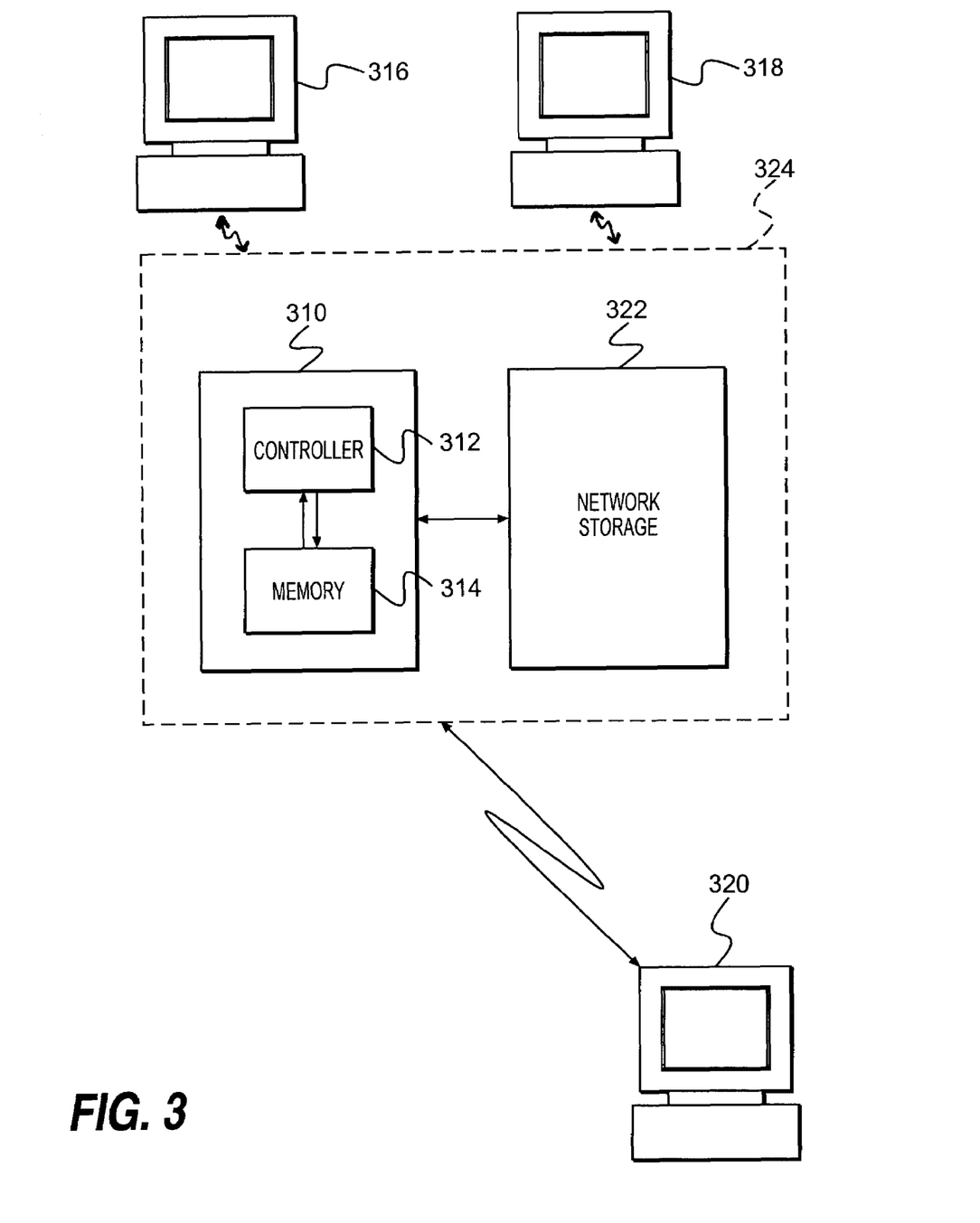
FIG. 3 illustrates a networked storage system of an embodiment of the present application.

FIG. 3 illustrates an exemplary storage network 324, including a server 310 and at least one networked storage device 322. It is noted that multiple storage devices, and even multiple servers, can be connected to the network 324, which can be any type of wired or wireless network including but not limited to a local area network, wide area network, etc. Connected to the network shown in FIG. 3 are three computers 316, 318, and 320, wherein the three computers are merely illustrative of computers connected to a network, noting that any number of computers may be connected to the network.

The server 310 may typically perform the methodology shown in FIG. 2, including receiving identification information from a networked computer such as computer 316 for example, when the computer is first introduced on the network, when new software is installed on the computer, etc. The server 310 preferably includes a controller 312, which is adapted to receive information identifying a computer upon software being reinstalled on a networked computer for example; compare the received identification information to identification information stored in a database in memory 314 for example; and provide corresponding network storage assignments to the networked computer upon the provided identification information matching stored identification information, stored in the database of memory 314 for example.

Memory 314 may store network storage assignments for at least one networked storage device such as 322 for example and corresponding identification information for each of a plurality of networked computers in the form of a database for example, or in any other manner. Thus, networked storage assignments may be stored on a server connected to a networked computer, wherein the server is preferably a storage management server which runs some type of storage allocation software such as Hewlett Packard allocator software and/or storage management software.

Although storage assignments and storage allocation on network storage device 322 have not been discussed in detail, it should be understood by one of ordinary skill in the art that the network storage assignments may include LUNs assigned to a computer and corresponding to storage space on at least a portion of at least one storage device, such as in at least one spindle of at least one disk drive for example, such as but not limited to, that previously discussed with regard to background FIG. 1 of the present application. Thus, network storage device 322 may include at least one disk drive, or any other type of storage medium including but not limited to flash RAM, tape, any type of array of disk drives such as a redundant array of independent disks (RAID), etc. Thus, the particularly mentioned storage assignments may include logical units of storage (LUNs) assigned to a network computer, and the LUNs assigned to a computer may correspond to the storage space on at least one disk drive associated with the network.

Although the method of the present application is preferably utilized when storage allocation software is reinstalled on a networked computer, it may also be utilized when other types of software are reinstalled on a computer, and typically anytime a networked computer, for whatever reason, loses its previously allocated network storage assignments. By maintaining a database on the network server, and by utilizing information provided by a networked computer to the server after storage allocation software or other software has been installed on the computer, network storage assignments can easily be retrieved and provided back to the networked computer.

In a further preferred embodiment of the present application, it is recognized that a networked computer may provide not only information identifying the computer, but also information indicating network storage assignments, such as when the computer is installed on the network. Such network storage assignment are typically and almost always not correct. Therefore, the methodology of the present application may include not only storing network storage assignments and corresponding identification information for a plurality of networked computers, but also receiving both information identifying the computer and information indicating networked storage assignments of a computer when a computer has been installed on the network. In such an instance, the information indicating network storage assignments will be compared to previously stored information and acknowledged if it correctly matches corresponding information stored in the database for example. If the received network storage assignments are incorrect, corresponding network storage assignments, stored in association with the received identification information of the networked computer, will be provided to the computer upon the received identification information matching stored identification information.

The methodology of the present application may also be embodied in a computer readable medium, including code portions embodied thereon that, when read by a processor or controller (such as that of a network server for example), cause the processor to perform a function. Preferably, the computer readable medium includes a first code segment, adapted to cause the processor to compare identification information received from the networked computer to identification stored in association with network storage assignments for a plurality of network computers; and a second code segment, adapted to cause the processor to provide corresponding stored network storage assignments to the networked computer upon the received identification information matching the stored identification information.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of providing network storage assignments comprising:
   storing network storage assignments and corresponding identification information for a plurality of networked computers;
   receiving information identifying a computer when software is re-installed on a networked computer;
   comparing the received identification information to the stored identification information; and
   providing corresponding stored network storage assignments to the computer upon the received identification information matching the stored identification information.

2. The method of claim 1, wherein the networked storage assignments are stored on a server, connected to the networked computer.

3. The method of claim 2, wherein the networked storage assignments are stored on a storage management server.

4. The method of claim 2, wherein the networked storage assignments are stored in a database.

5. The method of claim 1, wherein the identification information includes an IP address of the computer and a machine name of the computer.

6. The method of claim 1, wherein the identification information includes an indication of an operating system of the computer.

7. The method of claim 1, wherein the provided network storage assignments include LUNs assigned to a computer and corresponding to storage space on at least one disk drive associated with the network.

8. The method of claim 1, wherein the provided network storage assignments are on the computer after the computer loses previously allocated network storage assignments.

9. The method of claim 1, wherein the information identifying a computer is received when storage allocation software is re-installed on the networked computer.

10. The method of claim 1, wherein the networked storage assignments include logical units of storage (LUNs) assigned to a networked computer.

11. The method of claim 10, wherein the LUNs assigned to a computer correspond to storage space on at least one disk drive associated with the network.

12. An apparatus, networked to a plurality of computers and at least one storage device, comprising:
   a memory storing network storage assignments on the at least one networked storage device and corresponding identification information for the plurality of networked computers; and
   a controller (1) receiving information identifying a computer upon software being re-installed on a networked computer, (2) comparing the received identification information to the stored identification information, and (3) providing corresponding network storage assignments to the computer upon the provided identification information matching the stored identification information, wherein the network storage assignments are multiple storage devices for the plurality of networked computers, and the identification information is a unique identifier that remains stored on the computer after an operating system is re-installed on the computer.

13. The apparatus of claim 12, wherein the memory stores network storage assignments on the at least one networked storage device and corresponding identification information for the plurality of networked computers in a database.

14. The apparatus of claim 12, wherein the apparatus is a server.

15. The apparatus of claim 13, wherein the identification information includes an IP address of the computer and a machine name of the computer.

16. The apparatus of claim 12, wherein the identification information includes an IP address of the computer and a machine name of the computer.

17. The apparatus of claim 16, wherein the identification information includes an indication of an operating system of the computer.

18. The apparatus of claim 15, wherein the identification information includes an indication of an operating system of the computer.

19. A method of providing network storage assignments, comprising:
   storing network storage assignments and corresponding identification information for a plurality of networked computers;
   receiving information indicating network storage assignments of a computer when the computer is installed on the network and receiving information identifying the computer;
   comparing the received identification information and the received information indicating network storage assignments to the stored information and acknowledging the received network storage assignments, if correct; and
   providing, if the received network storage assignments are incorrect and upon the received identification information matching the stored identification information, corresponding stored network storage assignments to the computer, and the identification information is a unique identifier that remains stored on the computer after storage allocation software is re-installed on the computer.

20. A computer readable medium including code portions embodied thereon that, when read by a processor, cause the processor to perform a function, comprising:
   a first code segment causing the processor to compare identification information received from a networked computer to identification information stored in association with network storage assignments for a plurality of networked computers; and
   a second code segment causing the processor to provide corresponding stored network storage assignments to the networked computer upon the received identification information matching stored identification information, wherein the identification information includes an internet protocol (IP) address of the computer and a machine name of the computer.

21. The computer readable medium of claim 20, wherein the identification information includes an indication of an operating system of the computer.

22. A method of providing network storage assignments, comprising:
   comparing identification information received from a networked computer to identification information stored in association with network storage assignments for a plurality of networked computers installed on a network; and
   providing corresponding stored network storage assignments to the networked computer upon the received identification information matching the stored identification information, wherein the identification information to be compared is received when a computer is installed on the network, and the identification information to be compared is received when software is re-installed on a networked computer.

23. The method of claim 22, wherein the provided network storage assignments include LUNs assigned to a computer and corresponding to storage space on at least one disk drive associated with the network.

24. The method of claim 22, wherein the identification information includes an IP address of the computer and a machine name of the computer.

25. The method of claim 24, wherein the identification information includes an indication of an operating system of the computer.

26. An apparatus, networked to a plurality of computers and at least one storage device, comprising:
   storage means for storing network storage assignments for the at least one networked storage device and corresponding identification information for the plurality of networked computers; and
   control means for comparing received identification information identifying a computer upon software being re-installed on a networked computer to stored identification information, and for providing corresponding network storage assignments to the computer upon the received identification information matching the stored identification information, wherein the identification information includes an IP address of the computer and a machine name of the computer.

27. The apparatus of claim 26, wherein the storage means stores network storage assignments on the at least one networked storage device and corresponding identification information for the plurality of networked computers in a database.

28. The apparatus of claim 27, wherein the apparatus is a server.

29. The apparatus of claim 27, wherein the network storage assignments are multiple storage devices for the plurality of computers.

30. The apparatus of claim 26, wherein the identification information includes an indication of an operating system of the computer.

* * * * *

UNITED STATES PATENT AND TRADEMARK OFFICE
CERTIFICATE OF CORRECTION

PATENT NO. : 7,356,576 B2
APPLICATION NO. : 10/260292
DATED : April 8, 2008
INVENTOR(S) : Kenneth J Rabe

It is certified that error appears in the above-identified patent and that said Letters Patent is hereby corrected as shown below:

In column 8, line 35, in Claim 1, after "assignments" insert -- , --.

In column 8, line 66, in Claim 8, after "are" insert -- installed --.

Signed and Sealed this

Twenty-ninth Day of July, 2008

JON W. DUDAS
*Director of the United States Patent and Trademark Office*